US010569385B2

(12) United States Patent
Rosvold

(10) Patent No.: US 10,569,385 B2
(45) Date of Patent: Feb. 25, 2020

(54) RELEASE OF SUBSEA CLAMP CONNECTOR BY WATERJET CUTTING OF DRIVE SCREW

(71) Applicant: VETCO GRAY SCANDINAVIA AS, Sandvika (NO)

(72) Inventor: Odd Marius Rosvold, Sandvika (NO)

(73) Assignee: VETCO GRAY SCANDINAVIA AS, Sandvika (NO)

(*) Notice: Subject to any disclaimer, the term of this patent is extended or adjusted under 35 U.S.C. 154(b) by 148 days.

(21) Appl. No.: 15/325,300

(22) PCT Filed: Jul. 7, 2015

(86) PCT No.: PCT/EP2015/065436
§ 371 (c)(1),
(2) Date: Jan. 10, 2017

(87) PCT Pub. No.: WO2016/005364
PCT Pub. Date: Jan. 14, 2016

(65) Prior Publication Data
US 2017/0165809 A1  Jun. 15, 2017

(30) Foreign Application Priority Data
Jul. 10, 2014  (NO) .................................. 20140878

(51) Int. Cl.
B24C 1/04    (2006.01)
B24C 3/16    (2006.01)
(Continued)

(52) U.S. Cl.
CPC ................ B24C 1/045 (2013.01); B24C 1/04 (2013.01); B24C 3/16 (2013.01); B24C 3/325 (2013.01);
(Continued)

(58) Field of Classification Search
CPC .. B24C 1/045; B24C 3/12; B24C 3/16; B24C 3/325; B24C 5/04; B24C 1/04; B26F 1/26; B26F 3/004
(Continued)

(56) References Cited

U.S. PATENT DOCUMENTS 2,125,915 A * 8/1938 Halbing .................. F23D 14/54
                                                    239/548
3,373,752 A * 3/1968 Kiyoshi .............. B05B 17/0623
                                                    134/1
(Continued)

FOREIGN PATENT DOCUMENTS

EP        2145689    *  1/2010

OTHER PUBLICATIONS

PCT Search Report and Written Opinion issued in connection with corresponding PCT Application No. PCT/EP2015/065436 dated Sep. 16, 2015.

Primary Examiner — Eileen P Morgan
(74) Attorney, Agent, or Firm — Baker Hughes Patent Organization

(57) ABSTRACT

Methods and arrangements are provided for release of an ROV operable subsea clamp connector, the clamp connector comprising at least two clamp segments hinged to move pivotally, and a drive screw connecting the clamp segments by threaded engagement with trunnions arranged rotatable in the pivoting ends of the clamp segments, the threads of the drive screw and trunnions turned such that the trunnions travel along the drive screw in mutually opposite directions when the drive screw is turned. An axial bore in the drive screw is adapted for accommodation of a waterjet cutting tool having a sideways pointing nozzle in a forward end, the waterjet cutting tool rotatable inside the bore while feeding high-pressure water through the nozzle, towards the wall of (Continued)

the drive screw until the wall of the drive screw is cut through.

7 Claims, 2 Drawing Sheets

(51) Int. Cl.
  *B24C 5/04*   (2006.01)
  *F16L 1/26*   (2006.01)
  *E21B 29/12*  (2006.01)
  *F16L 21/06*  (2006.01)
  *F16L 23/00*  (2006.01)
  *B24C 3/32*   (2006.01)
  *B26F 3/00*   (2006.01)
  *E21B 17/04*  (2006.01)

(52) U.S. Cl.
  CPC .............. *B26F 3/004* (2013.01); *E21B 17/04* (2013.01); *E21B 29/12* (2013.01); *F16L 1/26* (2013.01); *F16L 21/065* (2013.01); *F16L 23/003* (2013.01)

(58) Field of Classification Search
  USPC ...................................................... 451/76, 90
  See application file for complete search history.

(56) References Cited

U.S. PATENT DOCUMENTS

| | | | | |
|---|---|---|---|---|
| 4,119,160 | A * | 10/1978 | Summers | E21B 7/18 175/424 |
| 4,478,368 | A * | 10/1984 | Yie | B05B 7/1431 239/430 |
| 4,555,872 | A * | 12/1985 | Yie | B05B 7/1431 451/102 |
| 4,995,201 | A * | 2/1991 | von Borcke | B24C 3/325 134/100.1 |
| 5,209,406 | A * | 5/1993 | Johnson | B26F 3/004 239/434 |
| 5,380,068 | A * | 1/1995 | Raghavan | E21B 10/61 239/589 |
| 5,512,318 | A * | 4/1996 | Raghavan | B05D 3/12 427/230 |
| 5,570,712 | A * | 11/1996 | Mathieus | B05B 3/02 134/172 |
| 6,749,490 | B1 * | 6/2004 | Hafenrichter | B24C 1/045 451/2 |
| 6,824,453 | B1 * | 11/2004 | Andersson | A61C 17/02 451/102 |
| 8,550,873 | B2 * | 10/2013 | Vijay | B05B 1/083 451/3 |
| 9,446,500 | B2 * | 9/2016 | Miller | B24C 7/0023 |
| 9,453,384 | B2 * | 9/2016 | Von Wirth | E02D 9/04 |
| 9,757,756 | B2 * | 9/2017 | Vijay | B05B 1/083 |
| 2007/0063066 | A1 * | 3/2007 | Vijay | B26F 3/004 239/99 |
| 2010/0237165 | A1 * | 9/2010 | Krueger | B63H 25/46 239/11 |
| 2011/0241336 | A1 | 10/2011 | Long | |
| 2014/0087637 | A1 | 3/2014 | Miller et al. | |
| 2014/0157963 | A1 * | 6/2014 | Von Wirth | E02D 9/04 83/27 |
| 2015/0217305 | A1 * | 8/2015 | Yie | B24C 3/12 239/240 |
| 2017/0151650 | A1 * | 6/2017 | Miller | B24C 7/0023 |
| 2018/0021922 | A1 * | 1/2018 | Linde | B24C 1/045 451/2 |

* cited by examiner

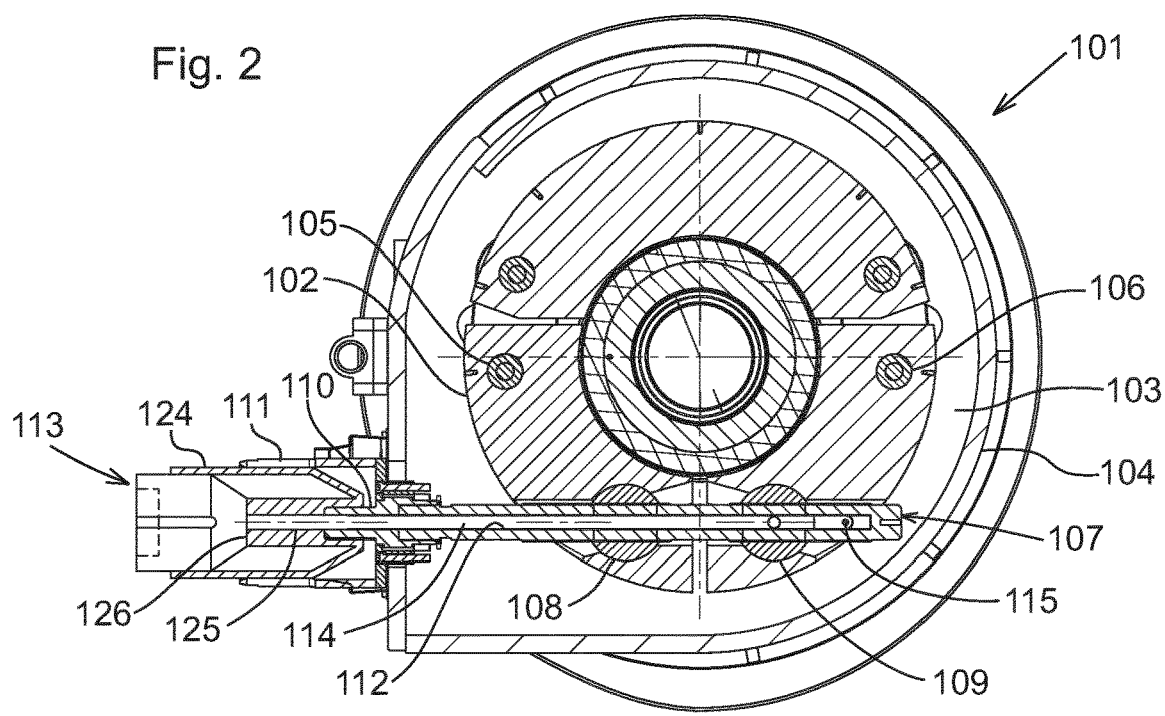
Fig. 2
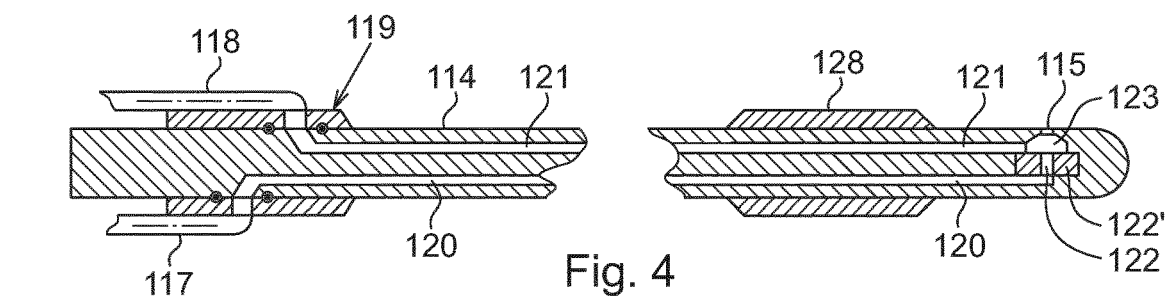
Fig. 3
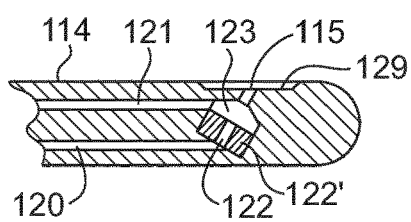
Fig. 4
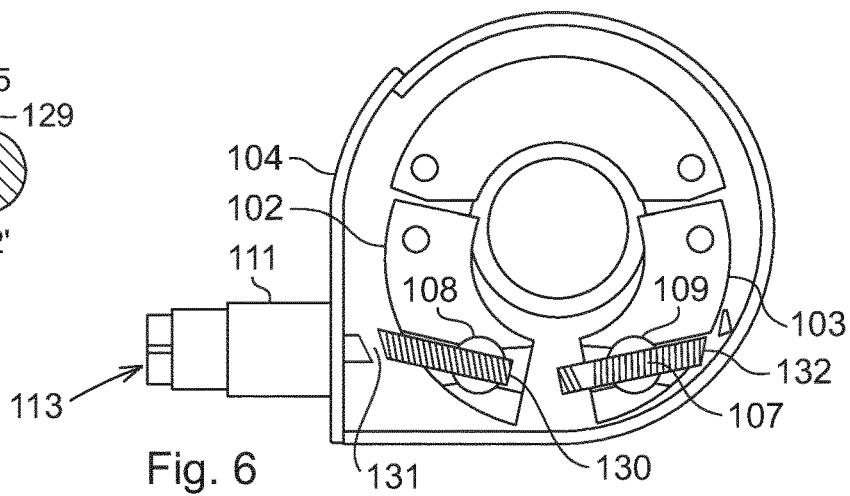
Fig. 5
Fig. 6

RELEASE OF SUBSEA CLAMP CONNECTOR BY WATERJET CUTTING OF DRIVE SCREW

BACKGROUND

Embodiments of the present invention refer to arrangements in remotely operated clamp connectors arranged for joining together pipes or other pipe mating equipment subsea.

More precisely, embodiments of the invention refer to an arrangement in a subsea clamp connector comprising at least two clamp segments hinged to move pivotally for tightening or widening a pipe insertion opening defined at least partially by the inner peripheries of the clamp segments. A drive screw connecting the clamp segments by threaded engagement with trunnions arranged rotatable in the pivoting ends of the clamp segments, the threads of the drive screw and trunnions turned such that the trunnions travel along the drive screw in mutually opposite directions when the drive screw is turned. The opening defined by the clamp segments is reduced when the drive screw is turned in a first or locking direction, whereas turning of the drive screw in the opposite or unlocking direction causes the clamp segments to widen the opening.

Embodiments of the present invention also refer to a method for release of a jammed subsea clamp connector.

Clamp connectors are widely used for many purposes in deep water installations, such as for joining together pipes or similar tubular members in end versus end relation, or for termination of pipes in other subsea equipment. Subsea clamp connectors can be designed for operation in horizontal as well as in vertical installation structures to provide sealed and leak-proof connection of risers, flowlines, manifolds, end terminations, pig launcher receivers etc. in the offshore oil and gas industry. To this purpose the subsea clamp connectors are usually designed internally with carefully machined surfaces to accommodate a sealing ring capable of separating the pipe content from the ambient sea, handling production pressure and seawater pressure at depths down to 1,000 meter and beyond. Metal sealing rings are typically used in subsea clamp connectors for operation at such depths. The clamp mechanism is typically supported on a backing plate and may lay exposed to the ambient sea, or may be enclosed inside a housing. The drive screw is journalled to be rotated but is arrested axially in the backing plate or housing. The drive screw can be motorized and rotated by a motor, or arranged for turning by means of an ROV (Remotely Operated Vehicle) via a tool interface, usually including a so called drive bucket, which is arranged in an accessible end of the drive screw.

Upon completed service the clamp connector is to be released and removed. Long service time in the subsea environment may occasionally cause the clamp connector to get jammed and unable to unlock through rotation of the drive screw by means of the ROV operated tool that is used for locking the clamp. In such situation alternative methods and tool arrangements are required to unlock the clamp connector in order to disconnect the pipe or equipment.

A method and tool arrangement for emergency release of a subsea clamp connector is previously disclosed in WO 2012/108775 A1. A clamp connector emergency release tool designed for subsea operation comprises a cylindrical hole-saw which is rotated by a motor and advanced axially into the clamp connector by means of a piston and cylinder assembly. The hole-saw separates the drive screw together with fragments of the clamp segments and trunnions, whereupon the remainders of the clamp segments are free to pivot from the locking position. The hole-saw is installed in an adapter arranged to be connected to the clamp connector, the adapter and clamp connector fitted for engagement with each other.

Methods and arrangements for emergency release of coupled structural elements are previously known also from other technical fields and applications. These methods and arrangements may include explosive fasteners that are installed in structures adapted through a dedicated design that allows separation of the structures upon detonation of an explosive charge built into the fastener.

BRIEF DESCRIPTION

An object for the present invention is to accomplish release of a subsea clamp connector through the provision of methods and means which are available for implementation without substantial alteration of existing clamp connector design or structure.

The object is met in a subsea clamp connector arrangement of a kind substantially as described in the introductory part, wherein a bore having a diameter is formed in the length direction of the drive screw; a waterjet cutting tool having an outer diameter smaller than the diameter of the bore is provided for insertion into the bore, the waterjet cutting tool in a forward end having a sideways pointing nozzle, the waterjet cutting tool rotatable in the bore while feeding high-pressure water through the nozzle, towards the wall of the drive screw.

In one aspect the present invention provides a method in which a waterjet cutting tool is operated inside the bore while feeding high-pressure water through the nozzle, towards the wall of the drive screw, until the wall of the drive screw is completely cut through. Cutting the drive screw at the targeted location between the trunnions will unlock the clamp connector by releasing at least one of the clamp segments which is allowed to swing about its pivot in the unlocking direction. It will be understood that a length of the drive screw remains engaged in the trunnion to follow the clamp segment in its swinging motion.

In other embodiments, such with clamp connectors where the clamp mechanism is enclosed and protected in a housing that provides little clearance for the drive screw or severed portions thereof to move inside the housing, it may be required to cut the drive screw at more than one location.

For example, embodiments of the invention comprises successively advancing, or retracting, the waterjet cutting tool in the bore, and operating the waterjet cutting tool for cutting the drive screw at several axially separated locations.

One embodiment involves cutting the drive screw on each side of both trunnions in threaded engagement with the drive screw. This embodiment causes release of both clamp segments to swing about their respective pivots in mutually opposite, unlocking, directions.

In a further aspect the present invention provides a waterjet cutting tool effective for cutting a drive screw in a subsea clamp connector, the waterjet cutting tool comprising: a sideways pointing nozzle supported in a forward end of the waterjet cutting tool, the waterjet cutting tool, having an outer diameter, adapted for rotation of the nozzle inside a bore formed in the length direction of the drive screw, and feed lines in the waterjet cutting tool supplying high-pressure water and abrasive to the nozzle from supply connections arranged in a rear end of the waterjet cutting tool.

In one embodiment the waterjet cutting tool is controllable for cutting the drive screw at a slanting angle relative to the drive screw axis. An angled cut can be achieved by moving the cutting tool axially in reciprocating motion while rotating the nozzle. The provision of angled cuts will aid in the relative displacement between the remaining portions of the drive screw, something which in some embodiments may be required to swing the subject clamp segment in the unlocking direction. The cut to be made closest to the ROV tool engageable end of the drive screw is an angular, slanting cut.

The nozzle may be arranged in the forward end of an elongate lance, the lance forming part of the waterjet cutting tool, wherein the rearward end of which is formed with an ROV tool engageable interface.

Inlets for high pressure water and for abrasive may be arranged rotatable on a swivel connection in the rear end of the waterjet cutting tool.

The waterjet cutting capacity in terms of pressure, flow and abrasive required to cut through the drive screw wall must be determined for each application with respect to the drive screw dimension and the steel quality used in the drive screw. Since the clamp connectors which can be of use in the subsea environment may vary strongly in size from one application to another, such as from a few inches to an order of 20-30 inches (about 500-750 mm) pipe diameter, e.g., also the torque load capacity and diameter of the drive screw varies strongly from one clamp connector to another. A closer specification concerning the waterjet cutting tool in this context is therefore omitted from this disclosure since it has to be calculated from case to case.

In the course of developing embodiments of the invention it has been established that the size of the bore diameter can be reduced down to about 40% of the drive screw diameter by proper choice and sizing of the waterjet cutting tool and nozzle. For example, in a drive screw having an outer radius of 25 mm, a bore radius of 10 mm can house a waterjet cutting tool of sufficient capacity to cut through the 15 mm wall of the drive screw. At other drive screw diameters the relation between the drive screw diameter and the bore diameter is adapted in order to provide a wall thickness that satisfies the load requirements and still allowing to be cut through by the high pressure waterjet. As a rule valid for a wide range of drive screw diameters it is contemplated that the diameter of the bore shall amount to about 40 to 80% of the outer diameter of the drive screw.

The maximum outer diameter of the lance-shaped waterjet cutting tool thus amounts to between 40 and 80% of the outer diameter of the corresponding drive screw, for which the waterjet cutting tool according to an embodiment of the invention is to be designed.

Further details and aspects of the present invention will be discussed below in the detailed description.

BRIEF DESCRIPTION OF THE DRAWINGS

Embodiments of the invention will be further explained below with reference to the accompanying, schematic drawings. In the drawings,
FIG. 2 is a sectional view through a subsea clamp connector arranged inside a housing,
FIG. 3 shows a waterjet cutting tool comprising a lance that is insertable in a hollow drive screw installed in the clamp connector of FIG. 2,
FIG. 4 is a partially broken away view showing in section the waterjet cutting tool of a first embodiment,
FIG. 5 shows the forward end and nozzle of another embodiment of the waterjet cutting tool,
and
FIG. 6 shows the clamp connector of FIG. 2 in released state by operation of the waterjet cutting tool.

DETAILED DESCRIPTION

Figure 1A:
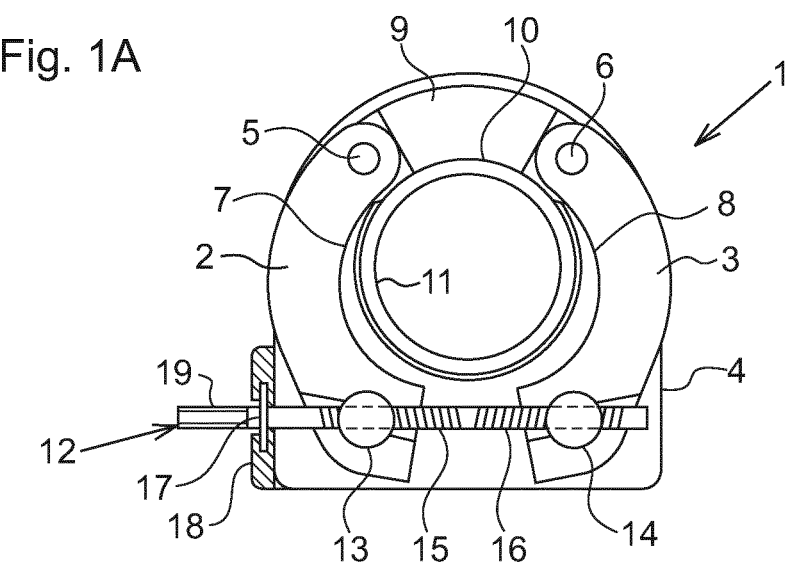
FIG. 1A shows a clamp connector in the unlocked state.
Figure 1B:
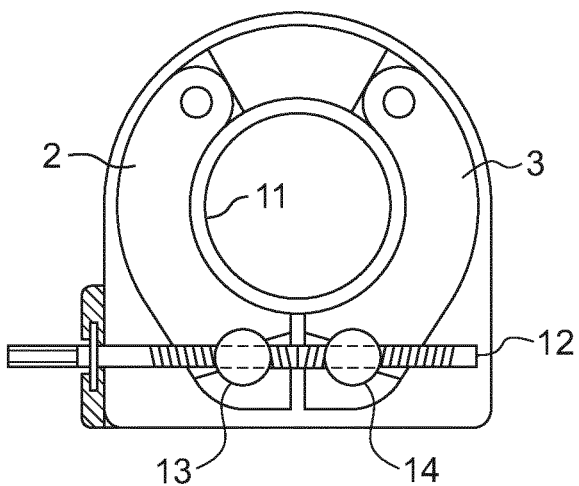
FIG. 1B is a corresponding view showing the clamp connector of FIG. 1A in the locked state.

With reference made to FIGS. 1A and 1B a subsea clamp connector 1 comprises a first clamp segment 2 and a second clamp segment 3 pivotally supported on a backing plate 4 by means of pivots 5 and 6. Arcuate inner peripheries 7 and 8 on the clamp segments 2 and 3 define an opening in which the end of a pipe or other tubular structure can be positioned for coupling to another pipe end or other pipe mating equipment. A third clamp segment 9, which can be stationary supported on the backing plate, has an inner periphery 10 which completes the circumference of the opening when the clamp connector is locked, as in FIG. 1B. In FIG. 1A however the clamp connector 1 is shown in its unlocked state.

In the drawings, reference number 11 refers to a sealing ring which is seated in the inner peripheries of the clamp segments. In the locking state the sealing ring is compressed by the clamp segments to provide a leak tight coupling between the pipes/equipment, as well as a barrier towards the surrounding sea.

Locking and unlocking the clamp connector 1 involves the operation of a drive screw 12 which interconnects the first and second clamp segments 2 and 3. In particular, the drive screw 12 extends in threaded engagement with trunnions 13 and 14 respectively, each trunnion received rotatable in a seat formed in a free pivotable end of the associated clamp segment 2 or 3, respectively. The drive screw 12 is formed on its exterior with a left hand thread 15 and a right hand thread 16 engaging internally threaded through holes in the trunnions 13 and 14, in effect of which the trunnions travel along the drive screw in mutually opposite directions when the drive screw is turned. The drive screw 12 may have a radial flange or shoulder 17 that is received rotatable between abutting surfaces in a journaling structure 18 by which the drive screw 12 is arrested axially in the clamp connector 1.

Accordingly, the clamp segments 2 and 3 will move towards each other when the drive screw is turned in a first and locking direction, whereas turning of the drive screw in the opposite and unlocking direction causes the clamp segments 2, 3 to move away from each other. Turning of the drive screw 12 on a subsea location can be accomplished using an ROV equipped with a tool that is adapted to engage a tool interface arranged in a tool engageable end 19 of the drive screw, which is accessible from the outside of the clamp connector.

Figure 1C:
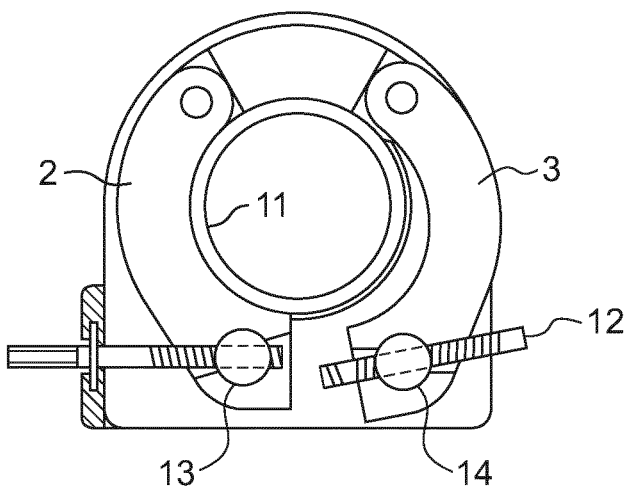
FIG. 1C shows the clamp connector of FIGS. 1A and 1B in released state by severing of the drive screw.

FIG. 1C shows the clamp connector 1 in released state. More precisely, FIG. 1C shows the clamp connector after the drive screw 12 has been severed between the trunnions 13 and 14. Severing of the drive screw in a subsea clamp connector can be realized as explained below by way of example, with reference to FIGS. 2-6.

With reference made to FIG. 2 a subsea clamp connector 101 comprises basically the same components that have previously been described in connection with the clamp connector 1. A first clamp segment 102 and a second clamp segment 103 are pivotally supported on pivots 105 and 106 in a clamp connector housing 104. A drive screw 107 interconnects the clamp segments 102 and 103 by threaded engagement with a couple of trunnions 108 and 109, the trunnions received rotatable in seats formed in the free ends of the associated clamp segments 102 and 103. One end 110 of the drive screw 107 is provided a tool interface in the form of a drive bucket 111 adapted to be engaged by an ROV tool.

The drive screw 107 is formed with a bore 112 that runs in the length of the drive screw from the ROV tool engageable end 110. A waterjet cutting tool 113 comprising a lance 114 having a sideways pointing nozzle 115 is insertable in the bore.

Waterjet cutting tools and abrasive waterjet cutting can be used to cut hard material such as carbon steel and other metal. In abrasive waterjet cutting the water-abrasive mixture leaves the nozzle at high speed, such as in the order of Mach 1-3. The water is supplied from ultra-high pressure water pumps delivering up to an order of 100,000 psi (689 MPa). Upstream of the nozzle, the high pressure water is forced through an orifice for mixing with abrasive material. The orifice is typically formed in a jewel/hard material, such as ruby, sapphire or diamond, or in a ceramic element such as tungsten carbide, e.g.

With reference to FIG. 3 a rear end of the lance 114 carries a tool interface 116 which is adapted for cooperation with an ROV. The tool interface 116 permits the lance 114 to be gripped by the ROV for insertion in the hollow drive screw 107 where the lance and nozzle is rotated through 360° while feeding water and abrasive through the nozzle, towards the inside wall of the bore 112. By rotation of the lance inside the bore, the nozzle and the jet discharged via the nozzle will of course rotate correspondingly. Rotation of the lance and nozzle can be driven by the ROV, or by a rotary drive engaging the rear end of the waterjet cutting tool, e.g.

With reference to FIG. 4, the rear end of the lance 114 carries an inlet 117 for high pressure water and an inlet 118 for abrasive material. The water and abrasive material can be supplied via conduits from a remote high pressure water source and abrasive material supply respectively. The water and abrasive inlets 117, 118 may be arranged on a swivel connection 119 that permits feeding of water and abrasive while the lance 114 is rotated. Separate channels 120 and 121 for water and abrasive are extended inside the lance 114 to feed water and abrasive individually towards the nozzle end of the lance 114. More precisely, upstream from the nozzle 115, the high pressure water is fed through an orifice 122 made in e.g. a jewel, such as diamond, or a ceramic material element 122'. Likewise upstream from the nozzle 115, the abrasive is mixed with water in a mixing chamber 123 downstream of the orifice 122. In the embodiment of FIG. 4, the nozzle 115 points substantially in radial direction transversely to the axis of the lance 114, whereas in FIG. 5 on the other hand, the nozzle 115 points at a slanting angle relative to the longitudinal axis C of the waterjet cutting tool and of the lance 114.

The waterjet cutting tool may further be associated with an insertion guide of a push-through type to ensure proper alignment of the lance 114 and the bore 112 upon insertion.

By way of example and with reference to FIG. 3, an insertion guide 124 may be designed with an outer diameter adapted to the inside diameter of the drive bucket 111. An internal passage 125 is adapted to be fitted onto the forward end of the lance 114, substantially as illustrated by chain-dotted lines in FIG. 3. A cavity or seat in the forward end of the insertion guide 124 is fitted to receive the end 110 of the drive screw, defining a mated position from where the lance 114 may be pushed forward into the bore 112. Abutting surfaces 126 and 127 may be arranged on the insertion guide and on the waterjet cutting tool, respectively, the abutting surfaces in contact determining the maximum length of insertion and defining the accurate positioning of the lance in the drive screw bore 112.

In order to define the position or distance of the nozzle 115 relative to the inside wall of the bore 112, spacers 128 may be arranged on the exterior of the lance 114 as indicated in FIG. 4. The nozzle may alternatively be distanced from the wall by locating the nozzle 115 in a recess 129 that is formed in the exterior of the lance 114, as indicated in FIG. 5. A free space between the lance 114 and the wall of the bore 112, or a channel (not shown) in the exterior of the lance, can thus be established to permit water to escape from the bore until the wall of the drive screw is cut through.

FIG. 6 illustrates, in a simplified drawing, the clamp connector of FIG. 2 after cutting the drive screw at three locations. In this embodiment the drive screw 107 will be cut off at the three locations, i.e. on each side of and between the trunnions 108 and 109 in threaded engagement with the drive screw. In this connection it serves to point out that the central cut at 130 can be located close to the trunnion 108 or 109, and in other words at a position that is located within the borders of the clamp segment 102 or 103 in order this way to avoid causing damage to the joining pipe flange/pipe hub that remains engaged by the clamp connector during the cutting process.

In the process of cutting, the waterjet cutting tool may be controlled in reciprocating motion in order to cut the drive screw at a slanting orientation relative to the drive screw axis, causing angular cuts as indicated by reference numbers 131, 132 in FIG. 6.

From the above it will be understood that the embodiments disclosed and illustrated provide for release of a subsea clamp connector that is jammed and therefore cannot be opened in the normal way by unwinding of the drive screw, or in a case of emergency, e.g. Release of the jammed clamp connector is thus accomplished in a procedure which comprises forming a bore in the length direction of the drive screw, the bore having a diameter, providing a waterjet cutting tool with a sideways pointing nozzle in a forward end, the waterjet cutting tool having an outer diameter that is smaller than the bore diameter, inserting the waterjet cutting tool into the bore, and rotating the waterjet cutting tool inside the bore while feeding high-pressure water through the nozzle, towards the wall of the drive screw, until the wall of the drive screw is cut through.

Embodiments of the procedure include, inter alia, severing of the drive screw into three or more pieces, debris and smaller fragments uncounted, as well as cutting at slanting angles relative to the drive screw axis.

From the above it will be realized that release of a jammed subsea clamp connector can be accomplished through methods and means which are available for implementation without substantial alteration of existing clamp connector design, and to be more exact simply by exchanging the standard drive screw for a drive screw which is modified for cooperation with a waterjet cutting tool in accordance with embodiments of the present invention.

Embodiments of the present invention avoid the drawbacks associated with previous mechanical cutting machines/tools which are made for one size and one configuration of subsea clamp connectors only, thus requiring development of multiple machines/tools and different interfaces.

The concept of using abrasive waterjet cutting to cut open jammed subsea clamp connectors is a reliable, non-complex and cost-efficient cutting technique as compared to mechanical cutting requiring complex mechanical tools with motors, guides and bearings etc., in confined spaces.

A technical advantage provided by embodiments of the present invention is the access to a reliable cutting tool that will work with all sizes of vertical or horizontal subsea clamp connections regardless of the installation in a subsea production system.

From the teachings provided herein it will be understood that modifications to the structural design of the waterjet cutting tool lies within reach of the skilled person without departing from the scope of the application as defined by the appended claims.

It is to be understood that even though numerous characteristics and advantages of various embodiments have been set forth in the foregoing description, together with details of the structure and functions of various embodiments, this disclosure is illustrative only, and changes may be made in detail, especially in matters of structure and arrangement of parts within the principles of the embodiments to the full extent indicated by the broad general meaning of the terms in which the appended claims are expressed. It will be appreciated by those skilled in the art that the teachings disclosed herein can be applied to other systems without departing from the scope and spirit of the application.

What is claimed is:

1. A waterjet cutting tool effective for cutting a drive screw in a clamp connector, the waterjet cutting tool comprising:
    an axially elongated lance comprising a first end, a second end opposite the first end, and an outer diameter sized to enable the lance to fit inside a bore extending longitudinally along the axis of a drive screw configured to move clamp segments of a subsea clamp to close the clamp;
    an ROV tool engageable interface at the first end of the lance;
    a nozzle proximal to the second end of the lance; and
    at least two conduits in fluid communication with the nozzle and configured to channel high-pressure water and abrasive, respectively, to the nozzle from supply connections external to the lance,
    wherein both lance and the nozzle are configured to traverse and rotate within the bore of the drive screw to cut away material on an inner surface of the drive screw defining the bore at spaced locations along the axis of the drive screw to sever the drive screw and open the clamp.

2. The waterjet cutting tool of claim 1, wherein the nozzle is pointing at an angle relative to a longitudinal axis (C) of the lance.

3. The waterjet cutting tool of claim 1, wherein inlets through which high-pressure water and abrasive enter the at least two channels are arranged on a swivel connection proximal to the first end of the lance.

4. The waterjet cutting tool of claim 1, wherein the maximum outer diameter of the lance amounts to between 40 and 80% of the outer diameter of the drive screw.

5. The waterjet cutting tool of claim 2, wherein inlets through which high-pressure water and abrasive enter the at least two channels are arranged on a swivel connection proximal to the first end of the lance.

6. The waterjet cutting tool of claim 2, wherein the maximum outer diameter of the lance amounts to between 40 and 80% of the outer diameter of the drive screw.

7. The waterjet cutting tool of claim 3, wherein the maximum outer diameter of the lance amounts to between 40 and 80% of the outer diameter of the drive screw.

* * * * *